(12) United States Patent
Hayakawa et al.

(10) Patent No.: US 12,194,828 B2
(45) Date of Patent: Jan. 14, 2025

(54) VEHICLE BODY LOWER SECTION STRUCTURE

(71) Applicant: HONDA MOTOR CO., LTD., Tokyo (JP)

(72) Inventors: Hirotaka Hayakawa, Tokyo (JP); Tetsuya Sugizaki, Tokyo (JP); Shungo Chino, Tokyo (JP); Takashi Nitta, Tokyo (JP); Kazuya Kimura, Tokyo (JP); Takafumi Raitoku, Tokyo (JP); Tsuyoshi Tanaka, Tokyo (JP); Toshihiro Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 320 days.

(21) Appl. No.: 17/945,128

(22) Filed: Sep. 15, 2022

(65) Prior Publication Data

US 2023/0101857 A1 Mar. 30, 2023

(30) Foreign Application Priority Data

Sep. 24, 2021 (JP) ................................. 2021-155774

(51) Int. Cl.
*B60K 1/04* (2019.01)

(52) U.S. Cl.
CPC ........ *B60K 1/04* (2013.01); *B60K 2001/0433* (2013.01)

(58) Field of Classification Search
CPC .............. B60K 1/04; B60K 2001/0433; B60K 2001/0405
See application file for complete search history.

(56) References Cited

U.S. PATENT DOCUMENTS

| | | | | |
|---|---|---|---|---|
| 6,227,322 B1* | 5/2001 | Nishikawa | .............. | B60R 16/04 180/68.5 |
| 7,144,039 B2* | 12/2006 | Kawasaki | ............... | B60L 50/71 280/124.109 |
| 10,737,729 B2* | 8/2020 | Erlacher | .................. | B60K 1/04 |
| 2007/0215399 A1* | 9/2007 | Watanabe | ................ | B60K 1/04 180/68.5 |

(Continued)

FOREIGN PATENT DOCUMENTS

JP 2015-214233 12/2015

*Primary Examiner* — Erez Gurari
(74) *Attorney, Agent, or Firm* — Amin, Turocy & Watson, LLP

(57) ABSTRACT

A vehicle body includes: a vehicle body floor having a battery housing portion; a pair of left and right side sills; a front cross member disposed in front of the battery housing portion; a rear cross member disposed behind the battery housing portion; and a battery cover that covers a battery from above. A widened portion of which a height in a vertical direction increases with respect to a center region of the front cross member in a vehicle width direction and of which a front-rear width expands to a vehicle rear side with respect to a front-rear width of the center region of the front cross member in the vehicle width direction is provided on an end portion of the front cross member on an outer side in the vehicle width direction. The battery cover is made of a metal and includes an outer connecting portion connected to the widened portion on an outer side in the vehicle width direction.

10 Claims, 5 Drawing Sheets

(56) References Cited

U.S. PATENT DOCUMENTS

| | | | | |
|---|---|---|---|---|
| 2008/0173489 | A1* | 7/2008 | Takasaki | B60K 1/04 |
| | | | | 180/68.5 |
| 2011/0143179 | A1* | 6/2011 | Nakamori | H01M 50/271 |
| | | | | 429/99 |
| 2012/0251862 | A1* | 10/2012 | Kano | B60L 50/51 |
| | | | | 429/99 |
| 2014/0284125 | A1* | 9/2014 | Katayama | B60L 58/21 |
| | | | | 180/68.5 |
| 2014/0338998 | A1* | 11/2014 | Fujii | B60K 1/04 |
| | | | | 180/68.5 |
| 2017/0305251 | A1* | 10/2017 | Hara | H01M 50/262 |
| 2019/0291556 | A1* | 9/2019 | Caliskan | B60K 1/04 |
| 2020/0223303 | A1* | 7/2020 | Saeki | B60K 1/04 |
| 2021/0339617 | A1* | 11/2021 | Ohkuma | H01M 50/242 |
| 2022/0059892 | A1* | 2/2022 | Matecki | H01M 50/249 |
| 2022/0111910 | A1* | 4/2022 | Hirota | B62D 27/026 |
| 2022/0231368 | A1* | 7/2022 | Wang | H01M 50/209 |
| 2022/0336886 | A1* | 10/2022 | Kellner | H01M 10/6553 |
| 2022/0384893 | A1* | 12/2022 | Schneider | H01M 50/242 |
| 2023/0023627 | A1* | 1/2023 | Ito | B62D 25/2036 |
| 2023/0101857 | A1* | 3/2023 | Hayakawa | B60K 1/04 |
| | | | | 180/68.5 |
| 2023/0140500 | A1* | 5/2023 | Balke | B60L 58/26 |
| | | | | 96/243 |
| 2023/0158878 | A1* | 5/2023 | Ota | H01M 10/6556 |
| | | | | 429/120 |
| 2023/0302887 | A1* | 9/2023 | Maguire | H01M 50/264 |
| 2023/0307770 | A1* | 9/2023 | Chang | H01M 50/264 |
| 2024/0014495 | A1* | 1/2024 | Lanzerath | H01M 50/262 |
| 2024/0014496 | A1* | 1/2024 | Wu | B60K 1/04 |
| 2024/0123810 | A1* | 4/2024 | Handing | B62D 25/20 |
| 2024/0170788 | A1* | 5/2024 | Wexel | B60K 1/04 |

* cited by examiner

VEHICLE BODY LOWER SECTION STRUCTURE

CROSS-REFERENCE TO RELATED APPLICATION

Priority is claimed on Japanese Patent Application No. 2021-155774, filed on Sep. 24, 2021, the contents of which are incorporated herein by reference.

BACKGROUND

Field of the Invention

The present invention relates to a vehicle body lower section structure in which a battery housing portion is provided on a vehicle body floor.

Background

As a vehicle body lower section structure of a vehicle, such a structure is known in which a battery housing portion is provided on a vehicle body floor (see, for example, Japanese Unexamined Patent Application, First Publication No. 2015-214233).

In the vehicle body lower section structure described in Japanese Unexamined Patent Application, First Publication No. 2015-214233, side sills extending in a front-rear direction of a vehicle body are disposed on both left and right sides of a lower side of a vehicle compartment, and the vehicle body floor is installed between the left and right side sills. The battery housing portion is provided on the vehicle body floor at a position below a rear seat, and a battery housing box is disposed in the battery housing portion. A front cross member and a rear cross member each having both end portions in a vehicle width direction connected to the left and right side sills are disposed in front of and behind the battery housing portion. The battery housing box for housing a battery is fixed to the front cross member and the rear cross member in front of and behind the battery housing portion.

In the vehicle body lower section structure described in Japanese Unexamined Patent Application, First Publication No. 2015-214233, because the front cross member and the rear cross member are disposed in front of and behind the battery housing box, when an impact load is input to one side sill from one side of a vehicle, the front and rear cross members smoothly transmit the load to the other side sill. As a result, the battery housing box and the battery therein are protected from the input impact load.

SUMMARY

In the vehicle body lower section structure described in Japanese Unexamined Patent Application, First Publication No. 2015-214233, the cross members are disposed in front of and behind the battery housing box that houses the battery therein, and the battery housing box and the battery therein are protected by the front and rear cross members. For this reason, considering a large impact load that is input from a lateral side of the vehicle, the cross member has to be a large and strong structure, a portion around the battery housing portion increases in size, and a weight of the vehicle body also increases.

An aspect of the present invention provides a vehicle body lower section structure capable of reliably protecting a battery while reducing a size and a weight of a reinforcing structure around a battery housing portion.

According to an aspect of the present invention, there is provided a vehicle body lower section structure including: a vehicle body floor having a battery housing portion in which a battery is disposed; a pair of left and right side sills which are disposed on both sides of the vehicle body floor in a vehicle width direction and extend in a front-rear direction of a vehicle body; a front cross member which is disposed in front of the battery housing portion and extends in the vehicle width direction and of which end portions on an outer side in the vehicle width direction are connected to the corresponding left and right side sills; a rear cross member disposed behind the battery housing portion; and a battery cover which is coupled to the front cross member and the rear cross member and covers the battery from above, wherein a widened portion of which a height in a vertical direction increases with respect to a center region of the front cross member in the vehicle width direction and of which a front-rear width expands to a vehicle rear side with respect to a front-rear width of the center region of the front cross member in the vehicle width direction is provided on the end portion of the front cross member on the outer side in the vehicle width direction, and wherein the battery cover is made of a metal and includes an outer connecting portion connected to the widened portion on an outer side in the vehicle width direction.

With the above configuration, when an impact load is input from one side of the vehicle to one side sill, the impact load is transmitted to the other side sill through the front cross member. At this time, the impact load input from the one side sill to one widened portion of the front cross member is transmitted to the battery cover made of a metal through one outer connecting portion. Further, the impact load transmitted to the battery cover is transmitted to the other widened portion of the front cross member through the other outer connecting portion and transmitted to the other side sill through the other widened portion. Therefore, in the vehicle body lower section structure of the present configuration, the impact load input from one side of the vehicle can be distributed and transmitted to the other side of the vehicle using the battery cover made of a metal.

Further, in the above configuration, the height in the vertical direction of the center region of the front cross member in the vehicle width direction is set to be low with respect to the widened portion at the end portion, and thus a cross section of the center region of the front cross member in the vehicle width direction can be made smaller, and a capacity in the battery housing portion can be increased. On the other hand, in the front cross member, the height in the vertical direction and the front-rear width decrease from the widened portion on the outer side in the vehicle width direction toward the center region, and thus stress is likely to concentrate on a portion where a cross-sectional shape changes abruptly. However, the widened portion of the front cross member is connected to the battery cover made of a metal through the outer connecting portion, and thus it is possible to relieve the concentration of the stress on the portion where the cross-sectional shape of the front cross member changes. Therefore, in a case where the present configuration is adopted, the impact load input from one side of the vehicle is efficiently transmitted to the other side of the vehicle, and the battery housed in the battery housing portion can be more reliably protected.

The battery cover may have a front cover ridge extending from one side in the vehicle width direction to the other side in the vehicle width direction along an upper edge of a front wall, the widened portion of the front cross member may have a widened portion ridge extending in the vehicle width direction along an upper edge of a front wall of the widened portion, and an end portion of the battery cover on an outer side in the vehicle width direction may overlap the widened portion such that the front cover ridge is continuous with the widened portion ridge.

In this case, when the impact load is input from one side of the vehicle to one side sill, the impact load is transmitted to the battery cover made of a metal through the widened portion ridge of the widened portion of the front cross member and the front cover ridge of the battery cover. For this reason, the impact load from a lateral side can be efficiently transmitted to the other side of the vehicle through the continuous high-rigidity ridges of the widened portion and the battery cover. Therefore, in a case where the present configuration is adopted, it is possible to more reliably protect the battery housed in the battery housing portion while preventing the front cross member from increasing in size.

A rear side frame extending in a vehicle rearward direction may be disposed on an inner side of each of the left and right side sills in the vehicle width direction, the battery cover may have: an upper wall; the front wall; a side wall extending downward from an end portion of the upper wall on an outer side in the vehicle width direction; and an end flange which extends outward in the vehicle width direction from a lower end of the side wall and overlaps an upper surface of the widened portion and an upper surface of the rear side frame, the front cover ridge may be provided continuously over a boundary portion between the front wall and the upper wall, a boundary portion between the front wall and the side wall, and a boundary portion between the front wall and the end flange, and the outer connecting portion may include a fixing point fixed to the widened portion on each of two walls intersecting with each other and interposing the front cover ridge.

In this case, the outer connecting portion of the battery cover has fixing points on the two walls that intersect with each other with the front cover ridge interposed therebetween, and thus the impact load input to the outer connecting portion from the widened portion of the front cross member through the two fixing points can be efficiently transmitted to the front cover ridge of the battery cover. Therefore, in a case where the present configuration is adopted, it is possible to further curb deformation and damage to the peripheral portions of the battery when the impact load is input from the lateral side of the vehicle.

The fixing point may include a first fixing point that fixes one of the walls of the outer connecting portion to the front wall of the widened portion in a front-rear direction, and a second fixing point that fixes the other of the walls of the outer connecting portion to an upper wall of the widened portion in a vertical direction.

In this case, the two walls of the outer connecting portion of the battery cover which intersect with each other are firmly fixed to the widened portion with the first fixing point and the second fixing point in the front-rear direction and in the vertical direction. For this reason, it is possible to prevent the battery cover from being rotationally deformed or torsionally deformed about an axis in the vehicle width direction when the impact load is input.

In addition, since the outer connecting portion of the battery cover includes the second fixing point that fixes the outer connecting portion to the upper wall of the widened portion in the vertical direction, in a case where a rider seat is installed above the battery cover, a load from the seat in the vertical direction can be efficiently transmitted to the widened portion. Therefore, in a case where the present configuration is adopted, it is possible to curb wobbling of the seat.

The side wall of the battery cover may incline downward from the end portion of the upper wall on the outer side in the vehicle width direction toward a vehicle width outer side, a portion of the front cover ridge positioned at the boundary portion between the front wall and the side wall may be an inclined ridge portion that inclines downward from the end portion of the upper wall on the outer side in the vehicle width direction toward a vehicle width outer side, the first fixing point may be disposed at a position overlapping the inclined ridge portion in the vehicle width direction, and the second fixing point may be disposed on a further outer side than the inclined ridge portion in the vehicle width direction.

In this case, since the second fixing point that fixes the outer connecting portion of the battery cover to the upper wall of the widened portion in the vertical direction is disposed on the further outer side than the inclined ridge portion of the front cover ridge in the vehicle width direction, the impact load input from the lateral side of the vehicle can be distributed over a wide range of the inclined ridge portion and the side wall of the battery cover. For this reason, it is possible to curb deformation (buckling) of the inclined ridge portion of the battery cover due to excessive concentration of the impact load on the inclined ridge portion.

The battery cover may include a reinforcing bead extending over from the end flange to the side wall.

In this case, the impact load input from the lateral side of the vehicle is transmitted from the widened portion of the front cross member to a side of the upper wall of the battery cover via the end flange and the side wall of the battery cover.

At this time, since the end flange and the side wall of the battery cover are provided with the reinforcing bead extending over both of the end flange and the side wall, the impact load is efficiently transmitted to a side of the upper wall in a state where deformation of the side wall is curbed by the reinforcing bead.

The reinforcing bead may be disposed on a further inner side than the fixing point provided on the end flange in the vehicle width direction.

In this case, the reinforcing bead is disposed on the further inner side than the fixing point on the end flange to which the load is input in the vehicle width direction in an initial state when the impact load is input from the lateral side of the vehicle. For this reason, the impact load input through the fixing point is reliably transmitted to a side of the upper wall of the battery cover via the bead. Therefore, in a case where the present configuration is adopted, it is possible to prevent the side wall of the battery cover from being deformed when the impact load is input from the lateral side of the vehicle, and it is possible to more reliably protect the battery from the impact load.

The fixing point provided on the end flange may be disposed between the front cover ridge and the reinforcing bead.

In this case, the impact load input from the lateral side of the vehicle is distributed to the front cover ridge and the reinforcing bead via the fixing point on the end flange to be transmitted to a side of the upper wall of the battery cover. Therefore, in a case where the present configuration is adopted, it is possible to further curb the deformation of the battery cover due to the impact load.

A plurality of the reinforcing beads may be disposed side by side in a front-rear direction on a vehicle rear side further than the fixing point provided on the end flange, each of the reinforcing beads may be formed in a substantially triangular shape having an apex angle positioned on an upper side of the side wall in a front view, and the reinforcing bead on a side close to the fixing point may be formed larger than the reinforcing bead on a side away from the fixing point.

In this case, each reinforcing bead is formed in a shape having the apex angle positioned on the upper side of the side wall of the battery cover in a front view, and thus the impact load input to the end flange of the battery cover can be efficiently transmitted to a side of the upper wall of the battery cover. In addition, since the reinforcing bead on a side close to the fixing point is formed larger than the reinforcing bead on a side away from the fixing point, the impact load input to the fixing point can be further efficiently transmitted to a side of the upper wall of the battery cover in the vicinity of the front cover ridge.

The battery cover may have: an upper wall; the front wall; a side wall extending downward from an end portion of the upper wall on an outer side in the vehicle width direction; and an end flange which extends outward in the vehicle width direction from a lower end of the side wall and overlaps an upper surface of the widened portion, the front cover ridge may be provided continuously over a boundary portion between the front wall and the upper wall, a boundary portion between the front wall and the side wall, and a boundary portion between the front wall and the end flange, a side ridge extending from an end portion on a side of the front wall to a vicinity of the rear cross member may be provided on a boundary portion between the side wall and the upper wall, and a rear-side fixing point fixed to the rear cross member may be provided on a rear edge portion of the battery cover at a position on a further inner side than a rear end portion of the side ridge in the vehicle width direction.

In this case, when the impact load is input from one side of the vehicle to one widened portion of the front cross member, the impact load is transmitted to the other side in the vehicle width direction along the front cover ridge on a front side of the front cross member. Further, the load transmitted to a front upper portion of the side wall of the battery cover along the front cover ridge is transmitted to a side of the rear edge portion of the battery cover through the side ridge that branches off from the front cover ridge to extend to the vehicle rear side and is received by the rear cross member at the rear-side fixing point of the rear edge portion. Therefore, in a case where the present configuration is adopted, the impact load input from one side of the vehicle to the front cover ridge of the front cross member is also efficiently distributed to a side of the rear cross member, and thus excessive concentration of the load on the front cross member can be avoided. Therefore, it is possible to curb the deformation of the front cross member, and thus it is possible to more reliably protect the battery.

In the vehicle body lower section structure according to the aspect of the present invention, the battery cover is made of a metal, and the outer connecting portion connected to the widened portion of the front cross member is provided on the end portion of the battery cover on the outer side in the vehicle width direction. For this reason, the impact load input from one side of the vehicle can be distributed to the battery cover made of a metal and efficiently transmitted to the other side of the vehicle. Therefore, in a case where the vehicle body lower section structure according to the aspect of the present invention is adopted, it is possible to reliably protect the battery while reducing a size and a weight of the reinforcing structure around the battery housing portion.

DESCRIPTION OF EMBODIMENTS

Figure 1:
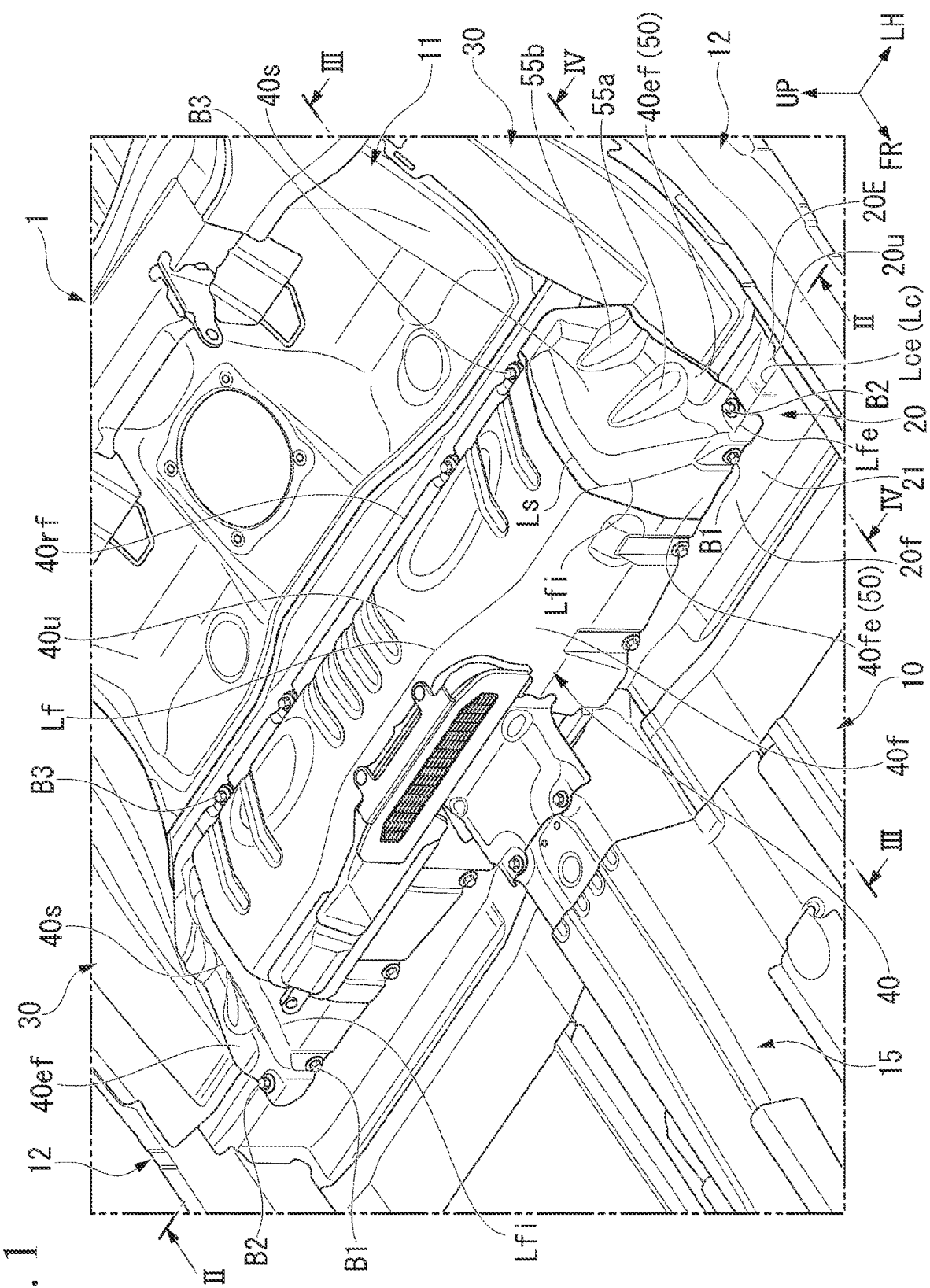
FIG. 1 is a perspective view of a vehicle body lower section near a rear portion of a vehicle according to an embodiment when seen from an upper side.

Hereinafter, an embodiment of the present invention will be described with reference to the drawings. In the following description, front, rear, up, down, left, and right refer to an orientation relative to a forward movement direction of a vehicle unless otherwise specified. Further, an arrow FR indicating a forward direction with respect to the vehicle, an arrow UP indicating an upward direction with respect to the vehicle, and an arrow LH indicating a leftward direction with respect to the vehicle are shown at appropriate places in the drawing.

Figure 2:
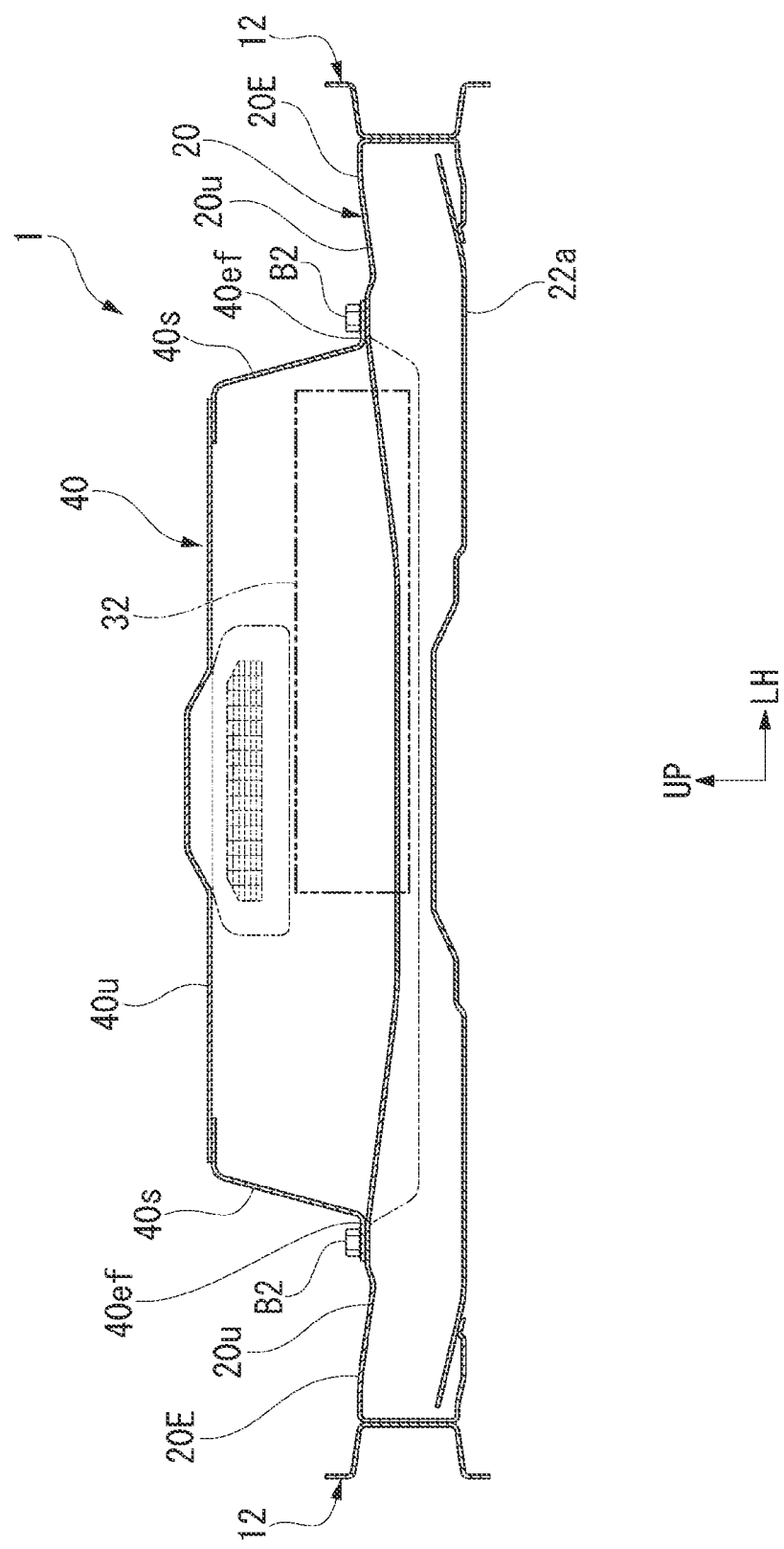
FIG. 2 is a cross-sectional view along line II-II of FIG. 1.

FIG. 1 is a perspective view of a vehicle body lower section near a rear portion of a vehicle 1 according to the present embodiment from an upper side obliquely to a front and left side. FIG. 2 is a cross-sectional view along line II-II of FIG. 1.

Reference sign 10 in FIG. 1 denotes a front floor panel disposed below a rider compartment. Reference sign 11 denotes a rear floor panel disposed behind the front floor panel 10. Side sills 12, which are skeleton frames extending in a front-rear direction of a vehicle body, are disposed on both left and right sides of a lower side of the rider compartment. The front floor panel 10 is installed between the left and right side sills 12. A lower surface side of the front floor panel 10 is supported by a plurality of floor frames (not shown). A rear side frame 30, which is a skeleton frame extending toward a rear side of the vehicle body, is coupled to an inner side of a rear region of each of the left and right side sills 12 of the vehicle body in a vehicle width direction. The rear floor panel 11 is installed between the left and right rear side frames 30.

The front floor panel 10, the rear floor panel 11, the side sills 12, the rear side frames 30, and main constituent members of the vehicle body lower section, which will be described later, are mainly made of metal materials.

A floor tunnel 15 extending in the front-rear direction of the vehicle body is provided at a center of the front floor panel 10 in the vehicle width direction. The floor tunnel 15 is formed in a cross-sectional shape of substantially a U shape that opens downward, and the cross-sectional shape of substantially a U shape extends in the front-rear direction of the vehicle body. The floor tunnel 15 bulges upward with respect to a substantially flat base wall (a substantially horizontally extending bottom wall) of the front floor panel 10.

Figure 3:
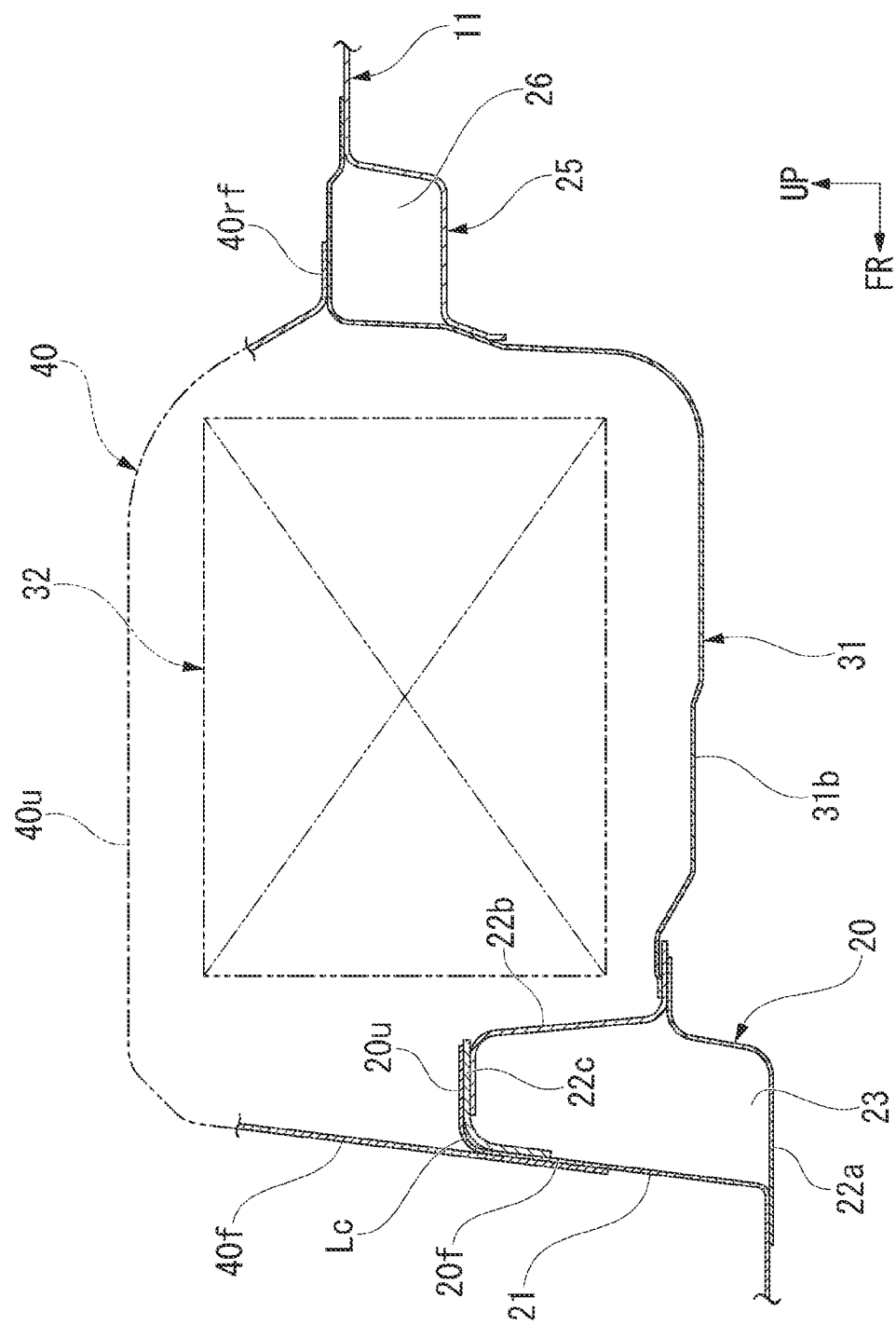
FIG. 3 is a cross-sectional view along line of FIG. 1.
Figure 4:
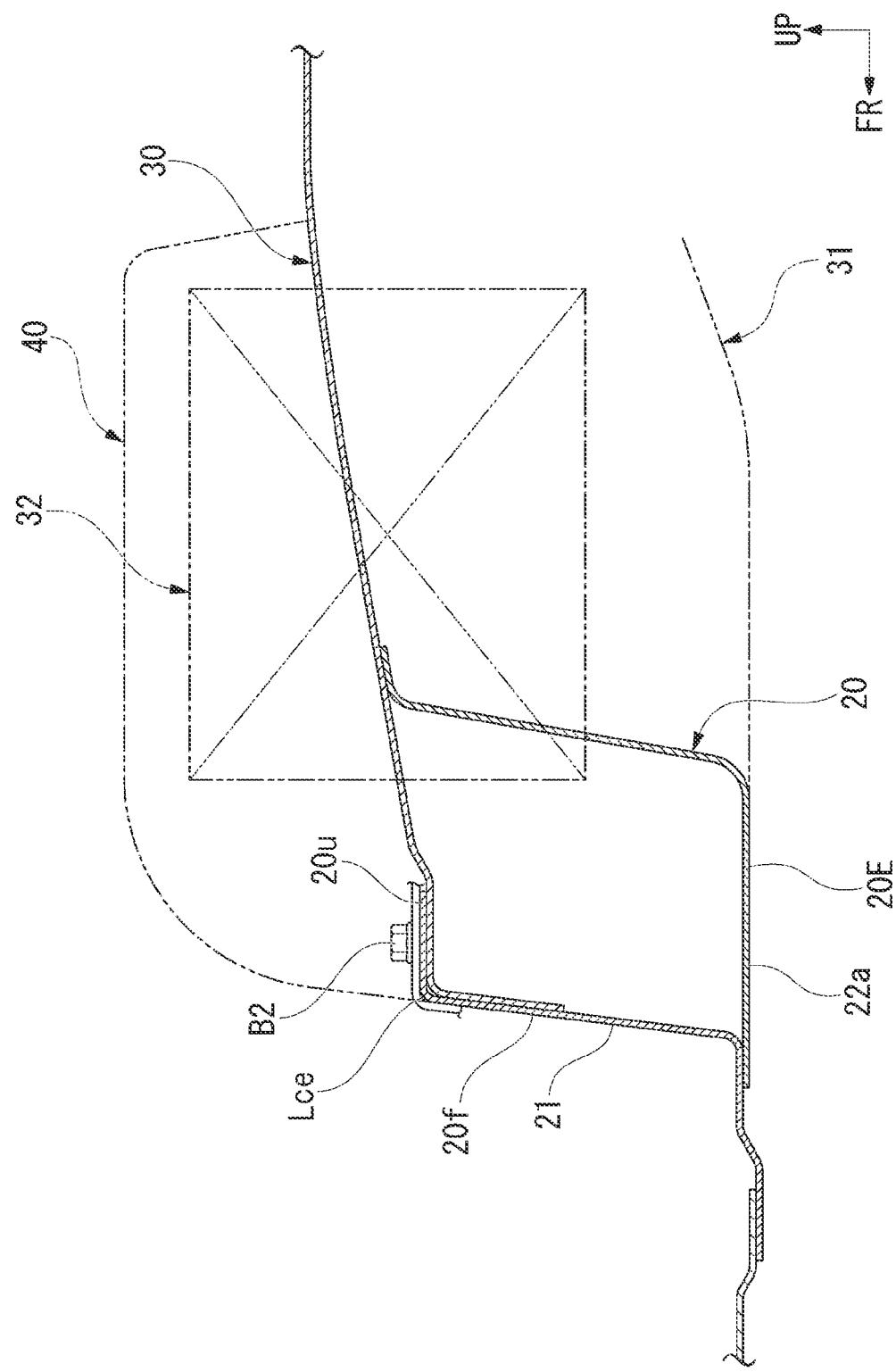
FIG. 4 is a cross-sectional view along line IV-IV of FIG. 1.

FIG. 3 is a cross-sectional view along line of FIG. 1. FIG. 4 is a cross-sectional view along line IV-IV of FIG. 1.

As shown in FIGS. 3 and 4, a rear edge portion of the front floor panel 10 is provided with a front cross member 20 extending in the vehicle width direction. The front cross member 20 is formed by joining a plurality of panel members 22a, 22b, and 22c to a main cross panel 21 joined to a rear end portion of the front floor panel 10. The front cross member 20 has a substantially rectangular closed cross section 23, and the closed cross section 23 extends in the vehicle width direction. End portions of the front cross member 20 on an outer side in the vehicle width direction are coupled to the left and right side sills 12 corresponding thereto.

As shown in FIG. 2, in the front cross member 20, a height in a vertical direction of a center region in the vehicle width direction is lower than a height of each of left and right end regions. As can be seen from a comparison between FIGS. 3 and 4, the left and right end regions of the front cross member 20 expand to a vehicle rear side with respect to a front-rear width of the center region of the front cross member 20 in the vehicle width direction. In each of the left and right end regions of the front cross member 20, a portion expanding in the front-rear width is hereinafter referred to as a "widened portion 20E."

As shown in FIGS. 3 and 4, the front cross member 20 has a front wall 20f that rises upward at a rear portion of the front floor panel 10 and an upper wall 20u that bends substantially at a right angle from an upper end portion of the front wall 20f and extends to the vehicle rear side. The front wall 20f and the upper wall 20u are formed continuously over substantially the entire region of the front cross member 20 in the vehicle width direction. Therefore, a ridge Lc formed by a bent corner portion between the front wall 20f and the upper wall 20u extends over substantially the entire region of the front cross member 20 in the vehicle width direction. For convenience of explanation, in the ridge Lc, a portion formed in each of the left and right widened portions 20E is hereinafter referred to as a "widened portion ridge Lce."

Further, as shown in FIG. 3, a front edge portion of the rear floor panel 11 is provided a rear cross member 25 extending in the vehicle width direction. The rear cross member 25 is formed by joining a rear edge portion of an intermediate floor panel 31, which will be described later, to the front edge portion of the rear floor panel 11. The rear cross member 25 has a substantially rectangular closed cross section 26, and the closed cross section 26 extends in the vehicle width direction. End portions of the rear cross member 25 on the outer side in the vehicle width direction are coupled to the left and right rear side frames 30 corresponding thereto.

The above-described intermediate floor panel 31 is disposed between the front floor panel 10 and the rear floor panel 11. The intermediate floor panel 31 constitutes the rear cross member 25 with its rear edge portion joined to the front edge portion of the rear floor panel 11 as described above. A front edge portion of the intermediate floor panel 31 is joined to the front cross member 20. The intermediate floor panel 31 is connected to the front floor panel 10 via the front cross member 20. A bottom wall portion 31b recessed below each upper surface of the front cross member 20 and the rear cross member 25 is provided between the front edge portion and the rear edge portion of the intermediate floor panel 31.

A battery 32 used for driving the vehicle and battery peripheral devices such as a control device (not shown) for electric power control are disposed on an upper surface side of the bottom wall portion 31b. Further, end portions of the bottom wall portion 31b on the outer side in the vehicle width direction are joined to the left and right side sills 12 corresponding thereto.

In the present embodiment, the front floor panel 10, intermediate floor panel 31, and the rear floor panel 11 constitute a vehicle body floor, and the bottom wall portion 31b of the intermediate floor panel 31 constitutes a battery housing portion.

A battery cover 40 made of a metal covers upper portions of the battery 32 and the battery peripheral devices housed in the bottom wall portion 31b (the battery housing portion) of the intermediate floor panel 31. The battery cover 40 is coupled to the front cross member 20 on the front side and the rear cross member 25 on the rear side by bolting or the like.

As shown in FIGS. 1 and 3, the battery cover 40 includes a rear flange 40rf that is joined to the upper surface of the rear cross member 25 (the rear edge portion of the intermediate floor panel 31), an upper wall 40u that inclines forward and upward from the rear flange 40rf and then extends forward substantially horizontally, and a front wall 40f that bends downward and extends from a front end portion of the upper wall 40u. The upper wall 40u gently curves and bulges upward at a center in the vehicle width direction.

A rear seat (not shown) is fixedly installed above the upper wall 40u of the battery cover 40. For this reason, a load of the rear seat and a rider sitting on the rear seat acts on the upper wall 40u of the battery cover 40 from above.

Figure 5:
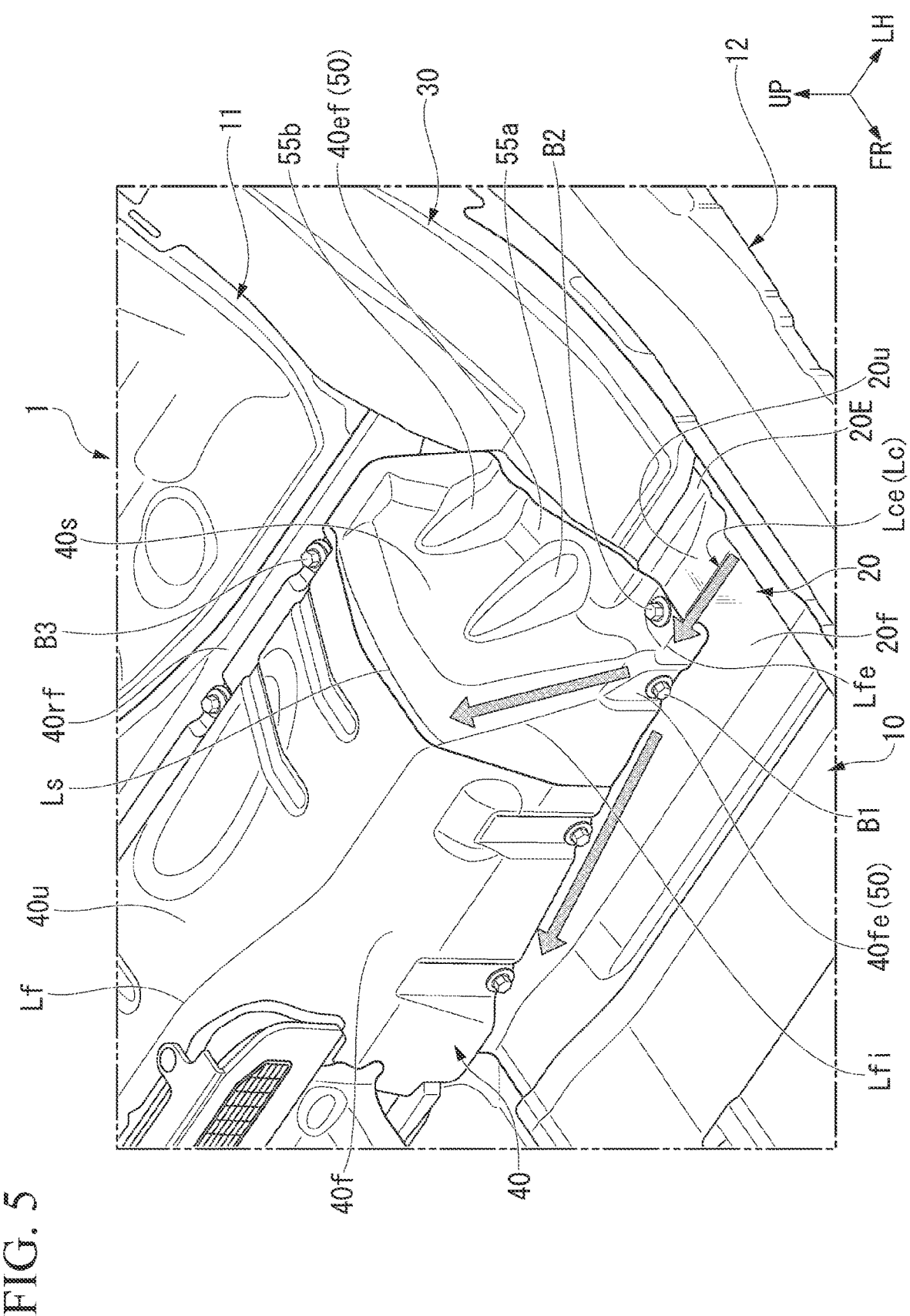
FIG. 5 is a perspective view showing a part of FIG. 1 in an enlarged manner.

FIG. 5 is a perspective view showing a part of FIG. 1 in an enlarged manner.

As shown in FIGS. 1 and 5, in an end portion of the upper wall 40u of the battery cover 40 on the outer side in the vehicle width direction, a side wall 40s that extends from the end portion toward the outer side in the vehicle width direction to incline downward and an end flange 40ef that bends from a lower end of the side wall 40s toward the outer side in the vehicle width direction and extends substantially horizontally are formed. The end flange 40ef is formed to be continuous with rear flange 40rf of the battery cover 40.

The front wall 40f of the battery cover 40 is provided with extension portions 40fe connected to both left and right sides on the outer side in the vehicle width direction. A center region of the front wall 40f of the battery cover 40 in the vehicle width direction bends downward and extends from the front end portion of the upper wall 40u. On the other hand, the left and right extension portions 40fe are bent downward and extend from the front end portions of the side walls 40s extending obliquely downward from the end portions of the upper wall 40u on the outer sides in the vehicle width direction and the front end portions of the end flanges 40ef. Therefore, the front wall 40f of the battery cover 40 has a substantially trapezoidal shape, when viewed from the front, in which a lower side is longer than an upper side.

The battery cover 40 has a front cover ridge Lf that extends from one end side to the other side in the vehicle width direction along an upper edge of the front wall 40f including the left and right extension portions 40fe. The front cover ridge Lf is continuous over a boundary portion between the center region of the front wall 40f in the vehicle width direction and the upper wall 40u, a boundary portion between the extension portion 40fe and the side wall 40s, and a boundary portion between the extension portion 40fe and the end flange 40ef.

A portion of the front cover ridge Lf positioned at the boundary portion between the extension portion 40fe and the side wall 40s is hereinafter referred to as an inclined ridge portion Lfi. A portion positioned at the boundary portion between the extension portion 40fe and the end flange 40ef is referred to as an end ridge portion Lfe.

The battery cover 40 of the present embodiment is formed by joining a plurality of metal panels. However, the battery cover 40 can also be formed from a single metal panel.

Here, in the end portion of the battery cover 40 on the outer side in the vehicle width direction, the end flange 40ef overlaps over upper surfaces of the corresponding left and right widened portions 20E of the front cross member 20 and the rear side frame 30, and the extension portion 40fe of the front wall 40f overlaps a front surface of the widened portion 20E (a front surface of the front wall 201). At this time, the end portion of the battery cover 40 on the outer side in the vehicle width direction overlaps the widened portion 20E such that the front cover ridge Lf (the end ridge portion Lfe) of the battery cover 40 is continuous with the widened portion ridge Lce of the widened portion 20E.

In the end portion of the battery cover 40 on the outer side in the vehicle width direction, the extension portion 40fe of the front wall 40f is fixed to the front surface of the widened portion 20E with a bolt B1, and the end flange 40ef is fixed to the upper surface of the widened portion 20E with a bolt B2. Hereinafter, the bolt B1 for fixing the extension portion 40fe to the front surface of the widened portion 20E is referred to as a first bolt B1, and the bolt B2 for fixing the end flange 40ef to the upper surface of the widened portion 20E is referred to as a second bolt B2.

A center region of the front wall 40f of the battery cover 40 overlaps the front surface of the front wall 20f of the front cross member 20 and is fixed to the front wall 20f of the front cross member 20 with a plurality of bolts (reference signs omitted).

In the present embodiment, the left and right end flanges 40ef and the left and right extension portions 40fe of the front wall 40f in the vehicle width direction constitute an outer connecting portion 50 of the battery cover 40. Further, a fixing portion of the battery cover 40 with the first bolt B1 constitutes a first fixing point in the outer connecting portion 50. A fixing portion of the battery cover 40 with the second bolt B2 constitutes a second fixing point in the outer connecting portion 50. The first fixing point and the second fixing point are provided on two walls (the extension portion 40fe of the front wall 40f and the end flange 40ef) that intersect with each other with the front cover ridge Lf interposed therebetween.

The first bolt B1 fixes the extension portion 40fe to the front wall 20f of the widened portion 20E in the front-rear direction at a position below the inclined ridge portion Lfi (a position overlapping the inclined ridge portion Lfi in the vehicle width direction) of the extension portion 40fe of the front wall 40f of the battery cover 40. The second bolt B2 fixes the end flange 40ef to the upper wall 20u of the widened portion 20E in the vertical direction at the end flange 40ef of the battery cover 40 positioned on the outer side from the inclined ridge portion Lfi in the vehicle width direction. Further, the second bolt B2 fixes the end flange 40ef to the widened portion 20E at a position close to the end ridge portion Lfe near the front end portion of the end flange 40ef.

Two reinforcing beads 55a and 55b are formed on the end flange 40ef and the side wall 40s of the battery cover 40 to straddle the both. The reinforcing beads 55a and 55b are disposed on the vehicle rear side from the fixing portion (the second fixing point) of the second bolt B2 on the end flange 40ef. The reinforcing beads 55a and 55b are disposed to be spaced apart from each other in the front-rear direction of the vehicle body.

Each of the reinforcing beads 55a and 55b is formed in a substantially triangular shape in front view, with an apex angle positioned on an upper side of the side wall 40s and opposite sides positioned on the end flange 40ef. Side portions of each of the reinforcing beads 55a and 55b bulge upward on a side surface of the side wall 40s, and lower ends of the bulging portions are connected to an upper surface of the end flange 40ef. The reinforcing beads 55a and 55b increase rigidity of the side wall 40s with a truss structure bulging from the side surface of the side wall 40s.

Further, the two reinforcing beads 55a and 55b are not of the same size, and the reinforcing bead 55a disposed on a front side is formed larger than the reinforcing bead 55b disposed on a rear side. In other words, the reinforcing bead 55a on the front side is set larger than the reinforcing bead 55b on the rear side in terms of a bulging height and a front-rear width.

Further, the two reinforcing beads 55a and 55b are disposed on the inner side from the fixing portion (the second fixing point) of the second bolt B2 provided on the end flange 40ef in the vehicle width direction. The fixing portion (the second fixing point) of the second bolt B2 provided on the end flange 40ef is disposed between the end ridge portion Lfe (the front cover ridge Lf) on a front end side of the end flange 40ef and the reinforcing bead 55a on the front side.

The battery cover 40 is further provided with a side ridge Ls that extends in a front-rear direction of the vehicle at a boundary portion between an upper end portion of the side wall 40s and the upper wall 40u. The side ridge Ls intersects with the front cover ridge Lf on a front end side and extends to the vicinity of the rear cross member 25 on a rear end side. A rear edge portion (the rear flange 40rf) of the battery cover 40 is fixed to the rear cross member 25 with a bolt B3 at a position on the inner side from the side ridge Ls in the vehicle width direction. The bolt B3 fixes the rear edge portion of the battery cover 40 to the rear cross member 25 in the vertical direction.

In the present embodiment, the fixing portion of the bolt B3 constitutes a rear-side fixing point.

As described above, in the vehicle body lower section structure of the present embodiment, the end portion of the front cross member 20 on the outer side in the vehicle width direction is provided with the widened portion 20E, and the outer connecting portion 50 of the battery cover 40 made of a metal is connected to the widened portion 20E. For this reason, when an impact load is input from one side of the vehicle 1 to one side sill 12, the impact load input from the one side sill 12 to one widened portion 20E of the front cross member 20 is transmitted to the battery cover 40 made of a metal through one outer connecting portion 50. Further, the impact load transmitted to the battery cover 40 is transmitted to the other widened portion 20E of the front cross member 20 through the other outer connecting portion 50 and transmitted to the other side sill 12 through the other widened portion 20E.

Therefore, in the vehicle body lower section structure of the present embodiment, it is possible to perform load transmission via the battery cover 40 made of a metal in parallel with load transmission of the front cross member 20 when the impact load is input from a side portion of the vehicle. Therefore, in a case where the vehicle body lower section structure of the present embodiment is adopted, it is possible to reliably protect the battery 32 and the battery peripheral devices while reducing a size and a weight of the reinforcing structure around the battery housing portion.

Further, in the vehicle body lower section structure of the present embodiment, the height in the vertical direction of the center region of the front cross member 20 in the vehicle width direction is set to be low with respect to the widened portion 20E at the end portion. For this reason, a cross section of the center region of the front cross member 20 in the vehicle width direction can be made smaller, and a capacity of the housing portion for the battery 32 can be increased. In addition, since the height of the upper surface of the center region of the front cross member 20 in the vehicle width direction is low, a harness such as an electric wire extending from the housing portion of the battery 32 into the floor tunnel 15 can be easily routed over the upper surface of the front cross member 20.

Here, in the front cross member 20, the height in the vertical direction and the front-rear width decrease from the widened portion 20E on the outer side in the vehicle width direction toward the center region, and thus stress is likely to concentrate on a portion where a cross-sectional shape changes abruptly. However, in the vehicle body lower section structure of the present embodiment, the widened portion 20E of the front cross member 20 is connected to the battery cover 40 made of a metal through the outer connecting portion 50, and thus it is possible to relieve the concentration of the stress on the portion where the cross-sectional shape of the front cross member 20 changes. For this reason, in a case where the present configuration is adopted, the impact load input from one side of the vehicle 1 is efficiently transmitted to the other side of the vehicle 1, and the battery 32 housed in the battery housing portion can be more reliably protected.

In addition, in the vehicle body lower section structure of the present embodiment, the front cover ridge Lf extending in the vehicle width direction is provided at an upper edge portion of the front wall 40f of the battery cover 40, and the widened portion ridge Lce extending in the vehicle width direction is provided at an upper edge portion of the front wall 20f of the widened portion 20E of the front cross member 20. Therefore, the end portion of the battery cover 40 on the outer side in the vehicle width direction overlaps the widened portion 20E such that the front cover ridge Lf is continuous with the widened portion ridge Lce. For this reason, when the impact load is input from one side of the vehicle 1 to one side sill 12, the impact load is transmitted to the battery cover 40 made of a metal through the widened portion ridge Lce of the widened portion 20E of the front cross member 20 and the front cover ridge Lf of the battery cover 40. Therefore, the impact load from a lateral side can be efficiently transmitted to the other side of the vehicle 1 through the continuous high-rigidity ridges of the widened portion 20E and the battery cover 40.

Therefore, in a case where the present configuration is adopted, it is possible to more reliably protect the battery 32 and the battery peripheral devices housed in the battery housing portion while preventing the front cross member 20 from increasing in size.

Further, in the vehicle body lower section structure of the present embodiment, the outer connecting portion 50 of the battery cover 40 includes the extension portion 40fe and the end flange 40ef that intersect with each other with the front cover ridge Lf interposed therebetween, and the extension portion 40fe and the end flange 40ef are provided with the fixing portion (the fixing point) of the first bolt B1 and the fixing portion (the fixing point) of the second bolt B2, respectively. For this reason, the impact load input to the outer connecting portion 50 from the widened portion 20E of the front cross member 20 through the fixing point of the first bolt B1 and the fixing portion of the second bolt B2 can be efficiently transmitted to the front cover ridge Lf of the battery cover 40.

Therefore, in a case where the present configuration is adopted, it is possible to further curb deformation and damage to the battery 32 and the peripheral portions thereof when the impact load is input from the lateral side of the vehicle 1.

Furthermore, in the vehicle body lower section structure of the present embodiment, the fixing portion of the first bolt B1 fixes one wall (the extension portion 40fe) of the outer connecting portion 50 to the front wall 20f of the widened portion 20E in the front-rear direction, and the fixing portion of the second bolt B2 fixes the other wall (the end flange 40ef) of the outer connecting portion 50 to the upper wall 20u of the widened portion 20E in the vertical direction. For this reason, the two walls (the extension portion 40fe and the end flange 40ef) of the outer connecting portion 50 which intersect with each other are firmly fixed to the widened portion 20E with the first bolt B1 and the second bolt B2 in the front-rear direction and in the vertical direction. Therefore, in a case where the present configuration is adopted, it is possible to prevent the battery cover 40 from being rotationally deformed or torsionally deformed about an axis in the vehicle width direction when the impact load is input from the lateral side of the vehicle.

In addition, in the vehicle body lower section structure of the present embodiment, the outer connecting portion 50 of the battery cover 40 is fixed to the upper wall 20u of the widened portion 20E with the second bolt B2 in the vertical direction, and thus a seat load acting on the upper wall 40u of the battery cover 40 from a rear seat can be efficiently transmitted to the widened portion 20E of the front cross member 20. Therefore, in a case where the present configuration is adopted, it is possible to increase support rigidity of the rear seat and curb wobbling of the rear seat.

In addition, in the vehicle body lower section structure of the present embodiment, the fixing portion (the first fixing point) of the first bolt B1 of the outer connecting portion 50 is disposed at a position overlapping the inclined ridge portion Lfi of the front cover ridge Lf in the vehicle width direction, and the fixing portion (the second fixing point) of the second bolt B2 is disposed on the outer side from the inclined ridge portion Lfi of the front cover ridge Lf in the vehicle width direction. For this reason, the impact load input to the outer connecting portion 50 from the lateral side of the vehicle through the fixing portion (the second fixing point) of the second bolt B2 can be distributed over a wide range of the inclined ridge portion Lfi and the side wall 40s of the battery cover 40. Therefore, in a case where the present configuration is employed, it is possible to curb deformation (buckling) of the inclined ridge portion Lfi of the battery cover 40 due to excessive concentration of the impact load on the inclined ridge portion Lfi.

Furthermore, in the vehicle body lower section structure of the present embodiment, the outer connecting portion 50 of the battery cover 40 is provided with the reinforcing beads 55a and 55b extending over from the end flange 40ef to the side wall 40s. For this reason, in a case where the impact load is input from the lateral side of the vehicle 1, the impact load can be efficiently transmitted to a side of the upper wall 40u of the battery cover 40 via the end flange 40ef and the side wall 40s in a state where the deformation of the side wall 40s of the battery cover 40 is curbed by the reinforcing beads 55a and 55b.

Further, in the vehicle body lower section structure of the present embodiment, the reinforcing beads 55a and 55b are disposed on the inner side from the fixing portion (the second fixing point) of the second bolt B2 provided on the end flange 40ef of the outer connecting portion 50 in the vehicle width direction. For this reason, the reinforcing beads 55a and 55b are disposed on the inner side from the fixing portion (the second fixing point) of the second bolt B2 on the end flange 40ef to which the load is input in the vehicle width direction in an initial state when the impact load is input from the lateral side of the vehicle 1. Therefore, in a case where the present configuration is adopted, it is possible to prevent the side wall 40s of the battery cover 40 from being deformed when the impact load is input from the lateral side of the vehicle 1, and it is possible to more reliably protect the battery 32 and the battery peripheral devices from the impact load.

In addition, in the vehicle body lower section structure of the present embodiment, the fixing portion (the second fixing point) of the second bolt B2 on the end flange 40ef is disposed between the end ridge portion Lfe (the front cover ridge Lf) of the battery cover 40 and the reinforcing bead 55a. For this reason, the impact load input from the lateral side of the vehicle 1 can be distributed to the front cover ridge Lf and the reinforcing bead 55a via the fixing portion (the second fixing point) of the second bolt B2 on the end flange 40ef to be transmitted to a side of the upper wall 40u of the battery cover 40. Therefore, in a case where the present configuration is adopted, it is possible to further curb the deformation of the battery cover 40 due to the impact load.

Further, in the vehicle body lower section structure of the present embodiment, the reinforcing beads 55a and 55b are disposed side by side in the front-rear direction on the vehicle rear side from the fixing portion (the second fixing point) of the second bolt B2 on the end flange 40ef. Each of the reinforcing beads 55a and 55b is formed in a substantially triangular shape with an apex angle positioned on an upper side of the side wall 40s in a front view, and the reinforcing bead 55a on a side close to the fixing portion (the second fixing point) of the second bolt B2 is formed larger than the reinforcing bead 55b on a side away from the fixing portion. For this reason, the impact load input to the end flange 40ef of the battery cover 40 can be efficiently transmitted to a side of the upper wall 40u of the battery cover 40 via the two reinforcing beads 55a and 55b having a truss structure. In addition, since the reinforcing bead 55a on a side close to the fixing portion (the second fixing point) of the second bolt B2 is formed larger than the reinforcing bead 55b on a side away from the fixing portion, the impact load input to the fixing portion (the second fixing point) of the second bolt B2 can be efficiently transmitted to a side of the upper wall 40u of the battery cover 40 in the vicinity of the front cover ridge Lf.

Furthermore, in the vehicle body lower section structure of the present embodiment, the boundary portion between the side wall 40s and the upper wall 40u of the battery cover 40 is provided with a side ridge Ls extending from the end portion (the front cover ridge Lf) on a side of the front wall to the vicinity of the rear cross member 25. Therefore, the rear edge portion of the battery cover 40 is fixed to the rear cross member 25 with the bolt B3 at a position on the inner side from the rear end portion of the side ridge Ls in the vehicle width direction. For this reason, when the impact load is input from one side of the vehicle 1 to one widened portion 20E of the front cross member 20, the impact load is transmitted to the other side in the vehicle width direction along the front cover ridge Lf of the front cross member 20. The impact load on the one side is transmitted to a side of the rear edge portion of the battery cover 40 through the side ridge Ls that branches off from the front cover ridge Lf to extend to the vehicle rear side and is received by the rear cross member 25 through the fixing portion of the bolt B3 of the rear edge portion.

Therefore, in a case where the present configuration is adopted, the impact load input from one side of the vehicle 1 to the front cover ridge Lf of the front cross member 20 is also efficiently distributed to a side of the rear cross member 25, and thus excessive concentration of the load on the front cross member 20 can be avoided. Therefore, in a case where the present configuration is adopted, it is possible to curb the deformation of the front cross member 20, and thus it is possible to more reliably protect the battery 32 and the battery peripheral devices.

The present invention is not limited to the above embodiment, and various design changes can be made without departing from the gist thereof.

For example, in the above embodiment, the battery housing portion and the battery cover are disposed in the rear portion of the vehicle compartment, but the battery housing portion and the battery cover may be disposed in a portion other than the rear portion of the vehicle compartment.

What is claimed is:

1. A vehicle body lower section structure comprising:
    a vehicle body floor having a battery housing portion in which a battery is disposed;
    a pair of left and right side sills which are disposed on both sides of the vehicle body floor in a vehicle width direction and extend in a front-rear direction of a vehicle body;
    a front cross member which is disposed in front of the battery housing portion and extends in the vehicle width direction and of which end portions on an outer side in the vehicle width direction are connected to the corresponding left and right side sills;
    a rear cross member disposed behind the battery housing portion; and
    a battery cover which is coupled to the front cross member and the rear cross member and covers the battery from above,
    wherein a widened portion of which a height in a vertical direction increases with respect to a center region of the front cross member in the vehicle width direction and of which a front-rear width expands to a vehicle rear side with respect to a front-rear width of the center region of the front cross member in the vehicle width direction is provided on the end portion of the front cross member on the outer side in the vehicle width direction, and
    wherein the battery cover is made of a metal and comprises an outer connecting portion connected to the widened portion on an outer side in the vehicle width direction.

2. The vehicle body lower section structure according to claim 1,
    wherein the battery cover has a front cover ridge extending from one side in the vehicle width direction to the other side in the vehicle width direction along an upper edge of a front wall,
    wherein the widened portion of the front cross member has a widened portion ridge extending in the vehicle width direction along an upper edge of a front wall of the widened portion, and
    wherein an end portion of the battery cover on an outer side in the vehicle width direction overlaps the widened portion such that the front cover ridge is continuous with the widened portion ridge.

3. The vehicle body lower section structure according to claim 2,
wherein a rear side frame extending in a vehicle rearward direction is disposed on an inner side of each of the left and right side sills in the vehicle width direction,
wherein the battery cover has: an upper wall; the front wall; a side wall extending downward from an end portion of the upper wall on an outer side in the vehicle width direction; and an end flange which extends outward in the vehicle width direction from a lower end of the side wall and overlaps an upper surface of the widened portion and an upper surface of the rear side frame,
wherein the front cover ridge is provided continuously over a boundary portion between the front wall and the upper wall, a boundary portion between the front wall and the side wall, and a boundary portion between the front wall and the end flange, and
wherein the outer connecting portion includes a fixing point fixed to the widened portion on each of two walls intersecting with each other and interposing the front cover ridge.

4. The vehicle body lower section structure according to claim 3,
wherein the fixing point includes
a first fixing point that fixes one of the walls of the outer connecting portion to the front wall of the widened portion in a front-rear direction, and
a second fixing point that fixes the other of the walls of the outer connecting portion to an upper wall of the widened portion in a vertical direction.

5. The vehicle body lower section structure according to claim 4,
wherein the side wall of the battery cover inclines downward from the end portion of the upper wall on the outer side in the vehicle width direction toward a vehicle width outer side,
wherein a portion of the front cover ridge positioned at the boundary portion between the front wall and the side wall is an inclined ridge portion that inclines downward from the end portion of the upper wall on the outer side in the vehicle width direction toward a vehicle width outer side,
wherein the first fixing point is disposed at a position overlapping the inclined ridge portion in the vehicle width direction, and
wherein the second fixing point is disposed on a further outer side than the inclined ridge portion in the vehicle width direction.

6. The vehicle body lower section structure according to claim 3,
wherein the battery cover comprises a reinforcing bead extending over from the end flange to the side wall.

7. The vehicle body lower section structure according to claim 6,
wherein the reinforcing bead is disposed on a further inner side than the fixing point provided on the end flange in the vehicle width direction.

8. The vehicle body lower section structure according to claim 7,
wherein the fixing point provided on the end flange is disposed between the front cover ridge and the reinforcing bead.

9. The vehicle body lower section structure according to claim 7,
wherein a plurality of the reinforcing beads are disposed side by side in a front-rear direction on a vehicle rear side further than the fixing point provided on the end flange,
wherein each of the reinforcing beads is formed in a substantially triangular shape having an apex angle positioned on an upper side of the side wall in a front view, and
wherein the reinforcing bead on a side close to the fixing point is formed larger than the reinforcing bead on a side away from the fixing point.

10. The vehicle body lower section structure according to claim 2,
wherein the battery cover has: an upper wall; the front wall; a side wall extending downward from an end portion of the upper wall on an outer side in the vehicle width direction; and an end flange which extends outward in the vehicle width direction from a lower end of the side wall and overlaps an upper surface of the widened portion,
wherein the front cover ridge is provided continuously over a boundary portion between the front wall and the upper wall, a boundary portion between the front wall and the side wall, and a boundary portion between the front wall and the end flange,
wherein a side ridge extending from an end portion on a side of the front wall to a vicinity of the rear cross member is provided on a boundary portion between the side wall and the upper wall, and
wherein a rear-side fixing point fixed to the rear cross member is provided on a rear edge portion of the battery cover at a position on a further inner side than a rear end portion of the side ridge in the vehicle width direction.

\* \* \* \* \*